United States Patent
Jenner (10) Patent No.: US 9,664,001 B2
(45) Date of Patent: May 30, 2017

(54) CENTRALIZER AND ASSOCIATED DEVICES

(71) Applicant: CENTEK LIMITED, Newton Abbot, Devon (GB)

(72) Inventor: Andrew Jenner, Vechta (DE)

(73) Assignee: Centek Limited, Newton Abbot, Devon (GB)

( * ) Notice: Subject to any disclaimer, the term of this patent is extended or adjusted under 35 U.S.C. 154(b) by 0 days.

(21) Appl. No.: 14/836,195

(22) Filed: Aug. 26, 2015

(65) Prior Publication Data

US 2016/0084020 A1    Mar. 24, 2016

Related U.S. Application Data

(60) Provisional application No. 62/054,585, filed on Sep. 24, 2014.

(51) Int. Cl.
*E21B 17/10*    (2006.01)
*F16F 1/00*    (2006.01)

(52) U.S. Cl.
CPC ...... *E21B 17/1078* (2013.01); *E21B 17/1028* (2013.01); *F16F 1/00* (2013.01)

(58) Field of Classification Search
CPC .......... E21B 17/1078; E21B 17/1028
See application file for complete search history.

(56) References Cited

U.S. PATENT DOCUMENTS

| 2,666,241 | A |   | 1/1954  | Hall |
| 2,738,019 | A | * | 3/1956  | Atkinson ............ E21B 17/1028 166/213 |
| 3,196,952 | A | * | 7/1965  | Solum ................ E21B 17/1028 138/39 |
| 3,209,836 | A | * | 10/1965 | Hall, Sr. ............ E21B 17/1028 166/241.7 |

(Continued)

FOREIGN PATENT DOCUMENTS

| CN | 203114197 | 8/2013 |
| GB | 701567 | 12/1953 |

(Continued)

OTHER PUBLICATIONS

Search Report for British Patent Application No. GB1416862.9, tranmitted on Dec. 22, 2015.

(Continued)

*Primary Examiner* — Matthew R Buck
*Assistant Examiner* — Aaron Lembo (57) ABSTRACT

Disclosed herein is a centralizer for being mounted around a centralizer sub body to form a centralizer sub. The centralizer comprises first and second opposing end collars arranged, in use, to be positioned around a longitudinal axis of the centralizer. The centralizer also comprises a plurality of spring bows extending from the first end collar to the second end collar. The first end collar may comprise first and second end regions arranged, in use, to face one another. The first and second opposing end regions may comprise first and second engaging elements respectively. The first end (Continued)

region may be configured to be connected, in use, to the second end region via the first and second engaging elements. Also disclosed is a centralizer sub and an engaging device for use in forming a centralizer.

24 Claims, 3 Drawing Sheets

(56) References Cited

U.S. PATENT DOCUMENTS

| | | | | |
|---|---|---|---|---|
| 3,343,608 | A * | 9/1967 | Solum | E21B 17/1028 166/172 |
| 3,566,965 | A * | 3/1971 | Solum | E21B 17/1028 166/241.7 |
| 3,749,168 | A * | 7/1973 | Hall, Sr. | E21B 17/1028 166/241.7 |
| 4,021,083 | A | 5/1977 | Anderson | |
| 4,077,470 | A * | 3/1978 | Dane | E21B 17/1028 166/241.7 |
| 4,651,823 | A * | 3/1987 | Spikes | E21B 17/1028 166/241.7 |
| 4,794,986 | A * | 1/1989 | Langer | E21B 17/1028 166/241.7 |
| 6,997,254 | B2 | 2/2006 | Jenner | |
| 7,857,063 | B2 * | 12/2010 | Thornton | E21B 17/1078 166/207 |
| 8,360,161 | B2 * | 1/2013 | Buytaert | E21B 17/1014 148/402 |
| 8,770,280 | B2 * | 7/2014 | Buytaert | E21B 17/10 166/241.6 |
| D717,836 | S * | 11/2014 | Buytaert | D15/21 |
| D717,837 | S * | 11/2014 | Buytaert | D15/21 |
| D718,342 | S * | 11/2014 | Buytaert | D15/21 |
| 2001/0037882 | A1 | 11/2001 | Linaker | |
| 2004/0112592 | A1 | 6/2004 | Gremillion | |
| 2008/0264629 | A1 * | 10/2008 | Buytaert | E21B 17/1028 166/241.7 |
| 2009/0183885 | A1 | 7/2009 | Davison | |
| 2009/0308615 | A1 * | 12/2009 | Buytaert | E21B 17/1028 166/378 |
| 2011/0252595 | A1 | 10/2011 | Nagahori | |
| 2011/0290474 | A1 * | 12/2011 | Nutley | E21B 17/1028 166/241.1 |
| 2012/0061076 | A1 | 3/2012 | McDaniel | |
| 2013/0248206 | A1 | 9/2013 | Jordan | |
| 2014/0096888 | A1 * | 4/2014 | Buytaert | E21B 19/24 156/83 |
| 2014/0182839 | A1 * | 7/2014 | McDaniel | E21B 17/1028 166/241.6 |
| 2014/0251595 | A1 * | 9/2014 | Buytaert | E21B 19/24 166/241.1 |
| 2014/0251639 | A1 * | 9/2014 | Jewett | E21B 7/20 166/382 |
| 2015/0027684 | A1 * | 1/2015 | Jewett | E21B 17/1028 166/60 |
| 2015/0122508 | A1 * | 5/2015 | Boddeda | E21B 17/1028 166/379 |
| 2015/0376960 | A1 * | 12/2015 | Rodrigue | E21B 33/14 166/285 |
| 2016/0084021 | A1 * | 3/2016 | Jewett | G01B 21/22 166/302 |

FOREIGN PATENT DOCUMENTS

| | | |
|---|---|---|
| GB | 2148984 | 6/1985 |
| GB | 2465587 | 5/2010 |
| WO | 96/41063 | 12/1996 |

OTHER PUBLICATIONS

International Search Report for PCT Application No. PCT/GB2015/052480, transmitted on Feb. 15, 2016.

* cited by examiner

Detail A
Centraliser Joint

CENTRALIZER AND ASSOCIATED DEVICES

FIELD OF THE INVENTION

The present invention relates to the field of downhole devices, and more specifically but not exclusively to the field of such devices usable in oil and/or gas and/or water extraction. Some arrangements disclosed herein relate to centralizer devices. Some arrangements disclosed herein relate to centralizer sub devices and some arrangements disclosed herein relate to parts of centralizer devices.

BACKGROUND TO THE INVENTION

Centralizers are used in the oil, gas or water well drilling industries to centre a casing within a borehole or previously installed tubular.

Such casings are generally constructed in handleable lengths or 'joints', e.g. 12 m (40 ft). The assembly of the casings to a predetermined total length is referred to as a 'string', which is often a number of casings coupled together by couplers. Centralizers are disposed along the length of the string. Centralizers are comprised of circular end collars between which are affixed a number of bow springs. Stop devices, such as stop collars, are used to maintain centralizers at axial positions along casing joints.

There are ever increasing instances where the annular width between the casing and the Inner Diameter (ID) of the previously installed tubular will not permit passage of centralisers and stop devices. Annular clearances have become especially limited or small with the increase in 'deep water wells'. Furthermore, annular clearances have become reduced due to the necessity that well designs combat the increased pressures and exhibit the required tensile strengths.

To address this centralizer subs have been developed, integrally fulfilling the purpose of the centralizer, coupler between lengths of casing, and axial stop devices. Centraliser subs are generally made from coupling stock normally conforming to API 5CT, which may be machined to certain required dimensions. The coupling stock used for the centralizer sub bodies, have a variability in their Outer Diameter (OD) due to manufacturing "drift", but must conform with regulatory requirements such as API 5CT. These requirements ensure that these devices will be fit for purpose, and define and provide tolerances for diameters, and wall thicknesses etc. Centralizer subs are positioned and threaded between casing joints. Existing centralizer subs have various machined recesses on their OD which contain a spring bow centraliser. The purpose of these recesses is to allow full compression of the spring bows to below the surface of the maximum OD of the centralizer sub body. However, there are a number of issues or problems with existing centralizer subs, as now discussed.

The recesses are often machined to a depth that results in a wall thickness of the centralizer sub body that falls below that required for the API 5CT standard. There is then a reduction of the collapse pressure and tensile strength of the centralizer sub compared to the parent casing joints. To mitigate this, the material for the centralizer sub may be selected with higher mechanical strengths than that for the normal coupling stock. However, as a result material costs and material processing costs are increased.

Another existing solution is to provide a centralizer, coupled to the centralizer sub body, made from thinner than normal material. However, this results in a number of problems:

1. The centralizer exhibits a poor 'restoring force' when expanded inside an open or under reamed borehole. This may be compensated for by decreasing the length of the bow springs. However, this leads to higher insertion and running forces (drag).
2. Keeping thinner spring bows at their standard length, results in high stress loads at the join between the spring bow and the end bands. When the spring bows are fully compressed, permanent deformation of the spring bows can result. The required standoff, or minimum annulus width between the casing and the existing tubular in the open borehole will then be deficient and not comply with regulatory requirements. However, thinner rather than longer spring bows are typically used.

Additionally, centralisers are affixed in the machined recesses of the centralizer sub body by butt welding the end bands in situ within the recess. This leads to a number of problems:

1. Welds are performed from the outer side of end bands. This results in a poor, weak, weld joint of the thinner low strength material. The centralizer then can have a reduced strength in use, especially with very narrow annuli and high undulations of the well profile;
2. Because the welds are performed from the outside, the caps of the welds sit proud of the surface of the centralizer end bands. This means that one or any of the below are required to be done, with associated resulting problems:
   a. the recess in the centralizer sub body has to be made deeper to accommodate the thickness of the weld cap, thereby further compromising the strength of the centralizer sub body or requiring even higher performance materials;
   b. the centralizer end bands have to be made even thinner thereby further compromising the strength of the centralizer;
   c. the caps of the welds have to be ground down to meet clearance OD demands, thereby weakening the welds still further.

Therefore, in summary many existing centralizer subs suffer from very poor centraliser manufactured fits with subsequent impact on diameter increases and poor quality welds; the centralizer sub bodies have needed to be machined below the minimum OD tolerance causing concerns relating to the effect upon tensile strength, collapse and burst pressures; and stronger materials have frequently been used to compensate for or mitigate those concerns leading to an increase in cost for those materials and their processing and machining.

SUMMARY

According to a first aspect of the disclosure, a centralizer is provided for being mounted around a centralizer sub body to form a centralizer sub. The centralizer comprises first and second opposing end collars arranged, in use, to be positioned around a longitudinal axis of the centralizer. The centralizer also comprises a plurality of spring bows extending from the first end collar to the second end collar. The first end collar may comprise first and second end regions arranged, in use, to face one another. The first and second opposing end regions may comprise first and second engaging elements respectively. The first end region may be configured to be connected, in use, to the second end region via the first and second engaging elements.

The centralizer may further comprising one or more excess welding material receiving elements arranged, in use, to receive any excess welding material when the first and second end regions are connected by a welding process. The one or more excess welding material receiving elements may each define a recess or hole. The excess welding material receiving elements may be arranged proximate to where the first and second end regions are arranged to be connected. The first end region may be configured to be connected to the second end region via an engaging device arranged, in use, to be connected to the first and second engaging elements. The centralizer may further comprise the engaging device, in use.

The engaging device may comprise a first portion configured to engage with the first engaging element; and a second portion configured to engage with the second engaging element. The first and second engaging elements may have profiles arranged to match profiles defined by the first and second portions of the engaging device respectively. The first and second engaging elements may define recesses within the first and second end regions respectively, and the first and second portions of the engaging device are protrusions. The profiles of the first and second engaging elements may each comprise a neck extending from an edge of the first and second end regions into a head within the first end collar, respectively.

The first and second engaging elements may be arranged to connect to one another. The second end collar may have the same configuration as the first end collar. First and second end regions of the second end collar may be arranged at the same position as the first and the second end regions of the first end collar with respect to the spring bows. The centralizer may be a single piece centralizer formed from a blank. When the first and second end regions of the first end collar are connected, the first end collar may form a continuous ring.

According to another aspect of the disclosure, there is provided a centralizer sub comprising a centralizer sub body which is a generally tubular structure having a longitudinal axis, and a centralizer as described herein.

According to yet another aspect of the disclosure, there is provided a method of manufacturing a centralizer sub, the method comprising providing a centralizer sub body and mounting the centralizer on the centralizer sub body. The centralizer may be provided as described herein. The centralizer sub body may be provided as described herein.

The mounting the centralizer on the centralizer sub body may comprise wrapping the centralizer around the centralizer sub body so that the first and second end regions of the first end collar face one another, and connecting the first and second regions of the first end collar by a welding process.

According to another aspect of the disclosure an engaging device is provided for use in forming a centralizer. The centralizer may comprise first and second opposing end collars arranged, in use, to be positioned around a longitudinal axis of the centralizer, and a plurality of spring bows extending from the first end collar to the second end collar. The engaging device may comprise a first portion configured to connect to a first engaging element of a first portion of the first end collar, and a second portion configured to connect to a second engaging element of a second portion of the first end collar. In use, the engaging device forms part of the centralizer and connects the first and second portions of the end collar to one another to form the end collar.

The engaging device may further comprise one or more excess welding material receiving elements arranged, in use, to receive any excess welding material when the first and second portions of the engaging device are respectively connected to the first and second engaging elements of the first end collar by a welding process.

The one or more excess welding material receiving elements may each define a recess or hole. The excess welding material receiving elements may be arranged in portions of the engaging device proximate to where the first and second portions of the engaging device are arranged to be connected to the first and second engaging elements of the first end collar.

The first and second portions of the engaging device may each have a profile arranged to match a profile respectively defined by the first and second engaging elements of the first end collar. The first and second portions of the engaging device may be protrusions. The first and second engaging elements may define recesses.

The engaging device may be a figure-of-eight shape comprising two heads and a neck connecting the two heads, wherein the first and second portions are the two heads.

According to another aspect of the disclosure a centralizer is provided for being mounted around a centralizer sub body to form a centralizer sub. The centralizer may comprise first and second opposing end collars arranged, in use, to be positioned around a longitudinal axis of the centralizer, the first and second end collars comprising first and second end regions arranged, in use, to face one another. The centralizer may also comprise a plurality of spring bows extending from the first end collar to the second end collar. The centralizer may also comprise a plurality of engaging devices as disclosed herein. A first of the plurality of engaging elements may be arranged to connect the first end region of the first end collar to the second end region of the first end collar, and a second of the plurality of engaging elements may be arranged to connect the first end region of the second end collar to the second end region of the second end collar.

Disclosed herein is a centralizer sub body that does not require the machining of recesses to a depth that compromises the performance of a centralizer sub, and a method of forming the same. Also disclosed herein is a centralizer arranged to be coupled to the above centralizer sub body to form a centralizer sub. Also disclosed is a split centralizer arranged to be connected using a staple, in order that the integrity of the centralizer and that of the centralizer sub body to which the centralizer is affixed are maintained. Also disclosed is a staple that is arranged to be used in connecting the split centralizer, and a method of forming a centralizer using a staple.

A centralizer sub is disclosed that uses lengths of coupling stock that are machined to form a centralizer sub body with a common centralizer located around the body formed using a staple connection system, which can be inserted within an existing tubular and which conforms to regulatory requirements.

The centralizer sub body may have first and third portions, either side of a second portion around which the centralizer is positioned, of various designs such that spring bow performance integrity of the centralizer may be maximised with removal of permanent deformation from extreme flattening at point of rotation of spring bow to end collar.

The centralizer may be made from parts welded together. The centralizer may be configured to freely rotate about a centralizer sub body.

The micro-alloy steel that may be used for the centralizer and/or staple may be Boron steel. This is one example of the material that can be used for the centralizer. The material that may be used for the centralizer, protrusion, protrusions and/or band may be heat treatable to improve, for example, shear and tensile section strength properties. Such heat-treated strength may be of the order 90 tons per square inch.

BRIEF DESCRIPTION OF THE DRAWINGS

Specific arrangements of the disclosure shall now be described below by way of example only and with reference to the accompanying drawings in which.

SPECIFIC DESCRIPTION

The following description provides an example of an arrangement of a centralizer sub body, and a centralizer that is connected to the centralizer sub body to form a centralizer sub.

In essence, the centralizer sub body is made from a piece of coupling stock. Coupling stock often exhibits a variability in its OD, but must conform to regulatory requirements in terms of ID and OD for a particular material. The part of the centralizer sub body, around which the centralizer is positioned to form the centralizer sub, is machined to an OD from a coupling stock that still conforms to regulatory requirements. In one arrangement the part is machined to a depth that is less than the thickness of end collars of the centralizer. In one arrangement, the machined part is machined to an OD that is the minimum OD that conforms to regulatory requirements. This means that all different sized coupling stock can be machined to form the present centralizer sub body, and they will all meet regulatory requirements. In other arrangements, other suitable tubular structures can be machined to form the centralizer sub body, and the tubular structure does not need to be a standard coupling stock. Additionally, a method for the connection of the end bands of the centralizer around the centralizer sub body is provided that does not lead to an increase in the OD of the centralizer or to a weakening of the centralizer end bands. The centralizer can also be made to closely match the fixed 'minimum' OD of the machined section of the centralizer sub body. This means that centralizer subs can be made with minimised, and reproducible, overall ODs, whatever the OD of the coupling stock that was used to make the centralizer sub body.

An example arrangement of the centralizer sub shall now be described. Following this description, a detailed example with specific dimensions and tolerances is described.

Figure 1:
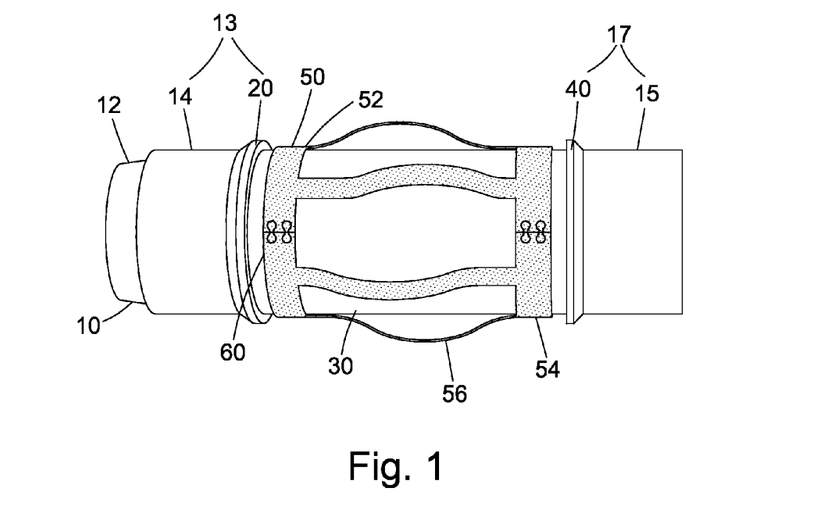
FIG. 1 shows a centralizer sub made from a centralizer sub body upon which a centralizer has been mounted.

FIG. 1 shows an arrangement of a centralizer sub. A centralizer sub body 10 has a first portion 13, a second portion 30, and a third portion 17. The centralizer sub body 10 has a male threaded end 12, enabling the centralizer sub to be coupled to a female threaded coupling of an adjacent centralizer sub body or adjacent casing joint. The other end of the centralizer sub body 10 is female threaded, enabling a casing joint to be coupled to it. The arrangement of the centralizer sub body 10 is discussed in more detail with reference to FIG. 2.

Figure 3:
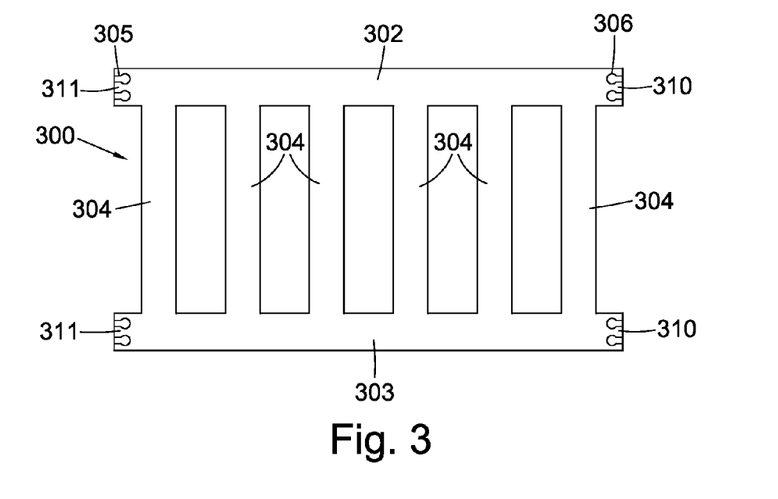
FIG. 3 shows an exemplary blank used in forming the centralizer of FIG. 1.

A centralizer 50 is mounted around portion 30 of the centralizer sub body 10. The centralizer 50 has a first end collar 52 and a second end collar 54 and six spring bows 56 that extend therebetween. Each spring bow forms a generally convex curve, in use. Only four of the six spring bows are shown in FIG. 1. The centralizer's first and second end collars 52, 54 are split, enabling the centralizer to be mounted around the second portion 30. Referring briefly to FIG. 3, the centralizer 50 is formed from a blank 300, which is bent into a generally cylindrical shape having a circular cross section. The single piece centralizer 50 then has opposing end regions of the end collars 52, 54 that are situated close to one another, and this is what is meant by the end collars being 'split'. The split ends of the end collars can be pulled apart, to an extent that allows the centralizer to be mounted onto the centralizer sub body 10, before the end collars are connected together. The first end collar 52 is connected at region 60 to form a continuous band encircling the second portion 30. The second end collar 54 is similarly connected to form a continuous band encircling the second portion 30. In this way the centralizer 50 is mounted around the second portion 30. The centralizer 50 can freely rotate about the axis of the centralizer sub body 10.

Figure 2:
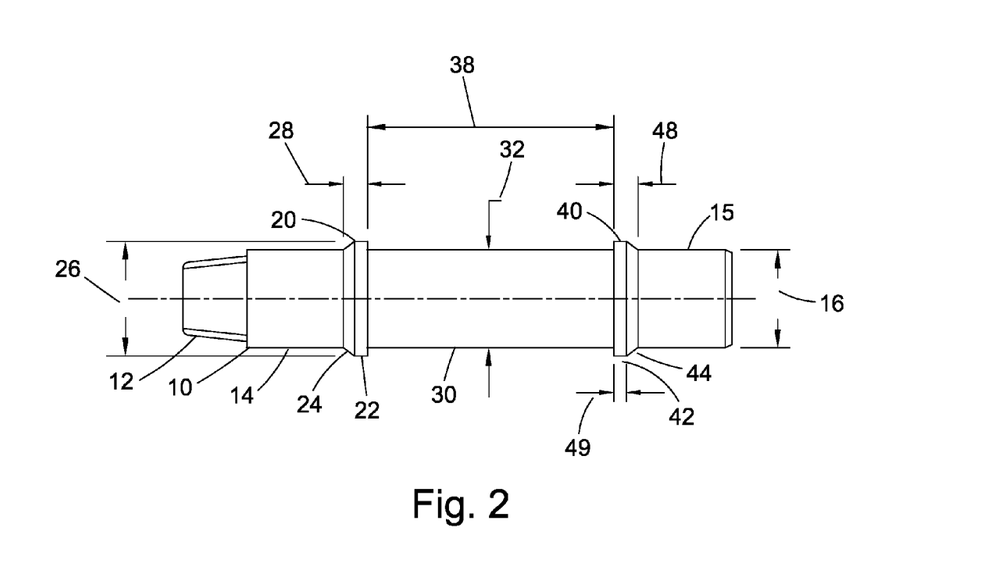
FIG. 2 shows the centralizer sub body as shown in FIG. 1.

FIG. 2 shows a side view of the centralizer sub body 10 of FIG. 1. The centralizer sub body 10 is made from a generally tubular body such as a standard coupling stock. The coupling stock may, for example, have a length 18 of approximately 40 inches (102 cm). The first portion 13 of the tubular body has a cylindrical portion 14, which is a 'raw' part of the section of coupling stock. In other words cylindrical portion 14 is an unmachined part of the coupling stock used to make the centralizer sub body 10. The cylindrical portion 14 has an OD 16 having a variability in size that is the same as that exhibited by standard coupling stock. The radial distance from the axis of the centralizer sub to the outer surface of cylindrical portion 14 is therefore the same as the radial distance from the axis of the centralizer sub to the outer surface of a coupling stock that is attached to the centralizer sub where they are formed into a straight line and where the attached coupling stock has the same OD as the coupling stock used to make the centralizer sub body 10.

The first portion 13 of the tubular body also has a protrusion in the form of a chamfered collar 20. The chamfered collar 20 can be a standard stop collar or stopping device that is positioned around the coupling stock, and may be held in place using screws or affixed by any other suitable means. Chamfered collar 20 has a 'flat' topped ring section 22 and an angled ring section 24 forming the chamfer. Ring section 22 has an OD 26. In one example arrangement the chamfered collar 20 may have an axial length 28 of approximately 1" (2.54 cm), with ring section 22 having an axial length 29 of approximately 0.4" (1 cm).

Therefore, the first portion 13 of the tubular body is formed from cylindrical section 14 and chamfered ring section 20.

Second portion 30 of the tubular body starts where the first portion 13 stops. Second portion 30 is a machined part of the coupling stock. Second portion 30 has an OD 32. OD 32 has a tight dimensional tolerance. OD 32 of the second portion is chosen as the minimum OD for a standard coupling stock, as used for the tubular body of the centralizer sub body 10, that conforms to API 5CT regulatory requirements. This means that every piece of coupling stock, which itself conforms to API 5CT, can be used to make the centralizer sub body 10. Furthermore, by machining the OD 32 of the second portion 30 to, or as close to, the minimum OD to comply with regulatory requirements, the OD of the centralizer sub as a whole is minimized.

The centralizer sub body 10 is machined not to have an OD less than OD 32 of the second portion. This means that the centralizer sub body 10 will always conform to the requirements of API 5CT, whatever the variability of the OD of the coupling stock from which it is manufactured. Centralizer sub body 10 can be mass produced in this manner. Additionally, by machining the second portion 30 to have a tightly constrained OD 32, means that the centralizer 50 can be manufactured to a similar tight tolerance with respect to ID of its first and second end collars 52, 54. This enables the centralizer 50 to fit closely around second portion 30, whilst being able to freely rotate axially about the centralizer sub body 10. Centralizer 50 can be mass produced with such tight tolerances matching those of the centralizer sub body. A centralizer sub can then be made, from whatever sized coupling stock that is compliant with API 5CT requirements, and a mass produced tightly tolerance centralizer can fit around the centralizer sub body 10, whatever the variability in the OD of the coupling stock from which the centralizer sub body 10 is made. The overall OD of the centralizer sub, including its centralizer, can be minimized, whilst the centralizer sub remains compliant with the dictates of API 5CT, and where standard coupling stock is used to make the centralizer sub body 10.

The third portion 17 of the tubular body starts where the second portion 30 stops. The third portion 17 of the tubular body has a cylindrical portion 15, which is again a 'raw' part of the coupling stock. The cylindrical portion 15 has an OD 16, which has the same variability as cylindrical portion 14. The third portion 17 of the tubular body also has a protrusion in the form of a chamfered collar 40, where the chamfered collar 40 has been attached to a part of the section of coupling stock. Chamfered collar 40 can be a stop collar or stopping device as discussed above for chamfered collar 20. Chamfered collar 40 has a 'flat' topped ring section 42 and an angled ring section 44 forming the chamfer. Ring section 42 also has an OD 26. In one example arrangement the chamfered collar 40 may have an axial length 48 of approximately 1" (2.54 cm), with ring section 42 having an axial length 49 of approximately 0.4 (1 cm)".

Therefore, the third portion 17 of the tubular body is formed from cylindrical section 15 and chamfered ring section 40.

As discussed above, centralizer 50, as shown in FIG. 1, is mounted around the second section 30 of the centralizer sub body 10 to form a centralizer sub. Chamfered collars 20 and 40 maintain the centralizer 30 in the correct longitudinal axial position around the second section 30.

The OD 26 of the ring sections 22 and 42 is therefore greater than OD 32 of the second portion. The difference between OD 32 and OD 26 is chosen such that when the centralizer 50 is mounted around the second portion 30 the radial distance from the axis to the OD of the first and second end collars 52, 54 is less than the radial distance from the axis to the outer extents of ring sections 22 and 42. This means that the spring bows 56 do not become completely flattened as the centralizer sub is pushed up against the wall of the existing tubular. Ring sections 22 and 42 will stop the spring bows from becoming deformed to an extent that leads to permanent deformation or deformed to an extent that leads to the spring bows not being able to perform optimally. This is because the outwardly chamfered collars 20, 40 extend further from the axis than the first and second end collars 52, 54 of the centralizer. The difference between OD 32 and OD 26 can be tailored for the particular use, being only slightly greater than the twice the thickness of the end collars 52, 54 to being significantly greater than this. In some arrangements, the difference between OD 32 and OD 26 need not be greater than twice the thickness of end collars 52, 54 where for example flattening of the spring bows 56 is not a concern, or is otherwise mitigated.

Therefore, chamfered collars 20 and 40 serve to protect the spring bows 56 of the centralizer from suffering permanent damage. Additionally, by having chamfered surfaces 24 and 44, they provide for ease of insertion of the centralizer sub into the existing tubular. They also provide for improved passage of the centralizer sub down the existing tubular. By having portions 22 and 42 that project above the surface of the second portion 30 to a height greater than the height to which the first and second end collars 52, 54 of the centraliser 50 project, the chamfered collars 20, 40 provide that the end collars 52, 54 of the centralizer 50 do not catch or foul on the inner surface of the existing tubular or borehole as the centralizer sub passes down the borehole or existing tubular.

In one example arrangement, the axial length 38 of the second portion 30, extending between the chamfered collar 20 and chamfered collar 40 may be approximately 1.5" (3.8 cm) greater in length than the length of the centralizer 50 in its unflexed state. When the centralizer 50 is centrally positioned on the second portion, the axial lengths 34 and 36 of the second portion 30 are shown either side of the centralizer in its unflexed state. The difference in length 38 and that of the centralizer 50, i.e. 34+36, can be tailored for the particular use and can be greater than or less than 1.5" (3.8 cm).

The structure of the centraliser 50 and the manufacture of the centralizer sub shown in FIGS. 1 and 2 shall now be described in detail with reference to FIGS. 3, 4, 5 and 6. The centralizer of the described arrangement has spring bows of equal length, and this means it can be made from a single blank, an example of which is shown in FIG. 3. Referring to FIG. 3, a blank 300, is formed from a single sheet of boron steel. The blank has two transverse web portions 302, 303 spaced apart by six spaced longitudinal web portions 304 which extend substantially parallel to one another and perpendicular to the webs 302, 303. The first and second transverse web portions 302, 303 are generally rectangular in shape, and are mutually parallel. The six longitudinal web portions 304 extend between the transverse web portions 302,303 to define therebetween five apertures 309 of equal size. The outer longitudinal web portions 304 are inset from the ends of the transverse web portions by around half the width of the apertures 309 to leave free end portions 310, 311 of the transverse web portions. One of the free end portions 310 forms a first end region of the first end collar 52 of the centralizer. The opposing free end portion, at the other end of the transverse web portion 302, forms a second end region of the first end collar of the centralizer. As will be appreciated from the description of FIGS. 4, 5 and 6, these free end portions are then arranged to connect with one another to form the end collar as a band. Holes are cut into the end portions 310 and 311. Hole 305 in end portion 310 forms a hole 62 in the first end region 53 of the first end collar 52 of the centralizer, and hole 306 forms a hole 64 in the second end region 55 of the first end collar 52 of the centralizer. Holes 62 and 64 are discussed in more detail below with reference to FIG. 5.

The web portions 302, 303 form the collars 52, 54 of FIG. 1. The longitudinal web portions 304 form the spring bows 56 of FIG. 1, of which four are shown. Bending operations are performed on the spring bows to achieve the configuration of FIG. 1.

It will, of course, be understood that this is simply an example of a possible blank and is used here illustratively. Boron steel is one example of the materials that may be used to form the blank, which include mild steel and many other different materials. One class of steel—which includes boron steel—is the class of micro-alloy steels. This class has been shown to be generally useful.

The blank is formed by cutting or punching from the sheet. A preferred technique is a high accuracy computer-controllable cutting method such as laser-cutting or water jet-cutting. Such a technique can allow great flexibility, for instance enabling 'specials' to be produced without a need for expensive dedicated tooling. The blank is then cold-formed into a generally cylindrical shape. This may be accomplished by rolling or by other techniques known in the art. The relatively ductile nature of the boron steel material forming the blank allows for the blank to remain in its cylindrical state after the forming has taken place. The boron steel, or other material used for the blank, is heat treatable to improve, for example, shear and tensile section strength properties. Such heat-treated strength may be of the order 90 tons per square inch.

The first and second centralizer end collars 52, 54 are formed into a near perfect circle. As discussed above, the ID of the end collars 52, 54 matches that of the OD of the second portion 30 of the centralizer sub body 10. The centralizer 50 then closely fits around the second portion 30, but can rotate about the axis of the centralizer sub body 10. The closeness of fit and thickness of the end collars 52, 54 are such that the end collars 52, 54 do not sit proud of the ring section 22 of chamfered ring 20 and the ring section 42 of chamfered ring 40 respectively. Blank 300 is formed using a cold extrusion process, which leads to forming stresses being evenly distributed such that during post forming heat treatment the ID tolerances of the centralizer 50 are maintained.

Figure 4:
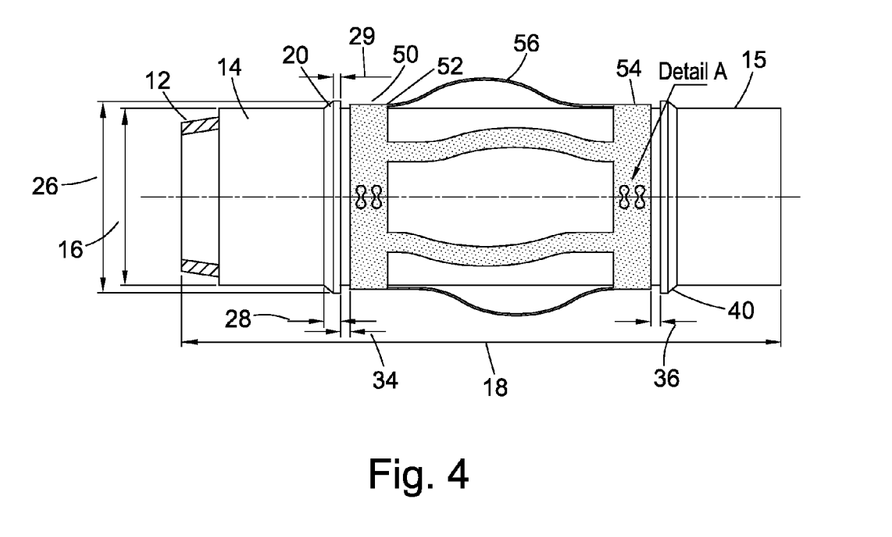
FIG. 4 shows the centralizer sub as shown in FIGS. 1 and 2, and the centralizer as shown in FIG. 1.
Figure 5:
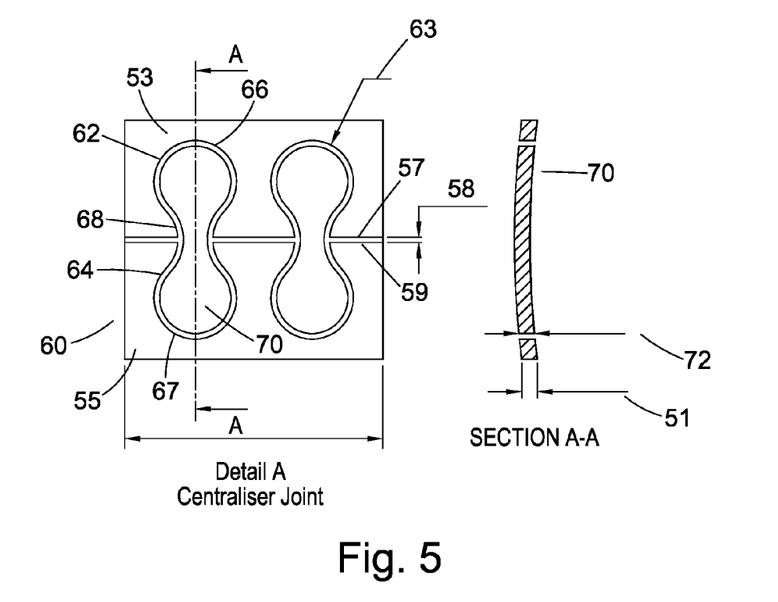
FIG. 5 shows holes in the end collar of the centralizer and staples used for inserting into those holes as used in forming the centralizer.

FIG. 4 provides a side view of the perspective view of the centralizer sub 10 shown in FIG. 1. FIG. 5 provides both a plan and a side view of the join between the staple and the end collar. In FIGS. 4 and 5, it can be seen that the first and second end regions 53, 55 of the first end collar 52 are profiled or cut to form holes in order to accept a staple 70, the staple 70 being one example of an engaging device and the profiling or cutting to form holes of the end regions are examples of engaging elements of the end collars. The second end collar is similarly configured. The first and second end collars 52, 54 are sprung open and fitted onto the second tubular section 30 of the centralizer sub body 10. The first and second end regions 53, 54 are pulled together and a staple 70 is inserted into the holes and welded with no appreciable heat conducted into the centralizer sub body 10. The centralizer 50 is described here as being formed around the second tubular section 30 of the centralizer sub body 10. However, the method of forming the centralizer here described applies to centralizers that can be used other than as part of a centralizer sub. For example, the method of forming a centralizer here described can lead to a centralizer that can be positioned around a sub body, and held in position by stop collars or other such axial locating means.

Returning to FIGS. 4 and 5, in more detail, a hole 62 is cut through the material of the first end collar 52 in the first end region 53. At least a portion of the hole is circular, with a radius 63. The hole 62 has a neck portion 68 that extends laterally such that the hole 62 is open on the side of the first end region 53 that faces the second end region 54. A similar hole 64 is cut through the material of the second end region 55. The holes 62, 64 in the first and second end regions 53, 55 have lateral inner surfaces 66, 67 respectively. These are surfaces that extend through the end regions and follow the contours of the holes 62, 64. The first and second end regions have lateral surfaces 57, 59 that face one another when the first end collar is connected, and when connected a gap 58 is formed between the lateral surfaces 57, 59. In other words, when the end regions 53, 55 are brought together in order that the first end collar 52 can be connected into a continuous ring, holes 62, 64 together form a figure of eight shape. It is clear that the above is only a representative example of engaging elements for the end collars.

Figure 6:
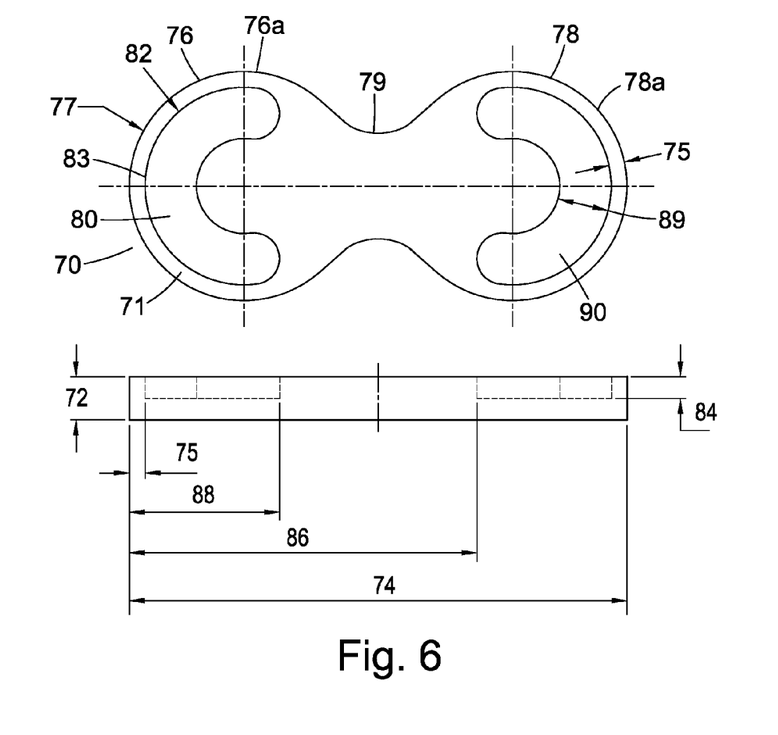
FIG. 6 shows one of the staples as shown in FIG. 5.

FIG. 6 illustrates the staple 70 that is inserted into holes 62, 64 and welded into place. Staple 70 is formed of the same material as the first end collar 52. The staple 70 has a thickness 72 that is the same as that of the first end collar and a length 74. Staple 70 has first and second portions 76, 78 and a neck portion 79 that match the holes 62, 64 and neck portions cut into the first and second end regions 53, 55 of the end collar 52. The first portion 76 has a lateral outer surface 76a that matches the lateral inner surface 66 of hole 62. The second portion 78 has a lateral outer surface 78a that matches the lateral inner surface 67 of hole 64. Therefore, the staple 70 has a figure of eight shape that matches the figure of eight shape formed by holes 62, 64 together. It is clear that the above is only a representative example of an engaging device.

The first and second portions 76, 78 of the staple are the same, and the radius of curvature of the staple extending from the first portion 76, through the neck 79 to the second portion 78 has the same radius of curvature as the first end collar 52 when it is formed around the second tubular section 30. The first portion 76 of the staple has an outer radius 77 that is less than the radius 63 of the hole in the end region 53. The difference in radii is appropriate to provide that the staple 70 is sufficiently close to the end region that a suitable weld join can be made. Those skilled in the art will know how to configure the engaging element and the engaging element such that they are appropriate positioned one to the other for being welded together.

First and second recesses 80, 90 are formed in the first and second portions 76, 78 of the staple 70. The recesses 80, 90 face outwards when the staple 70 is inserted into the end collar 52 and welded into position. The recesses are the same, and therefore only the first recess 80 will be described. Recess 80 is a semi-circular or "U" shaped or horseshoe shaped recess and has a depth 84 less than the thickness 72 of the staple 70. The radius 82 of the outer wall of the recess is such that a wall 71 of thickness 75 is formed in the staple. The wall 71 is formed between the lateral outer surface 76a of the staple and a lateral inner surface 83 of the recess 80. The recess need not be shaped as described in this example, and the skilled person will appreciate how such a wall can be formed in a staple or other engaging element.

As described above, the end regions 53, 55 of the first end collar 52 are brought together having been pulled apart slightly in positioning the centralizer around portion 30 of the centralizer sub body 10. The first and second end collars 52, 54 are positioned around the second tubular section 30. Staple 70 is inserted into the holes 62, 64 and welded into position. A welding process, such as tungsten inert gas (TIG) welding is used, where a non-consumable tungsten electrode is used. The wall 71 of the staple however forms an integral filler material for the weld. Furthermore, the recess 80 allows for molten material formed during the weld process to run into the recess 80. The weld does not then have a weld cap that sits proud of the surface of the staple 70 or proud of the surface of the first end collar 52, and the weld does not require grinding back. In other words the weld that is formed does not require ground dressing on the end band OD. The staple having wall 71 of thickness 75, that acts as an integral filler during the weld process, means that weld rods of incorrect material are not used when connecting the end collars 52 and 54 together. Therefore, the risk of the use of improper welding materials in the field is removed. In summary, the engaging device has a recess. In some arrangements, the recess in the engaging device allows molten material, formed during welding of the end regions of the centralizer end collar, to flow into the recess. In some arrangements, the recess in the engaging device provides that the thickness of the engaging device, after welding of the end regions of the centralizer end collar, is not greater than the thickness of an end region prior to connection. A weld cap does not need to be ground back, because molten material can flow into the recess and not sit proud of the end collar. A strong weld is formed, and centralizers of reduced thickness end collars or reduced thickness spring bows are not required. Centralizer sub bodies do not have to be machined to a depth that compromises regulatory requirements, enabling standard coupling stock to be used as the starting material for forming centralizer sub bodies. In some arrangements, the recess in the engaging device provides that the thickness of an engaging element, after connection of the end regions of the centralizer end collar, is not greater than the thickness of an end region prior to connection. In some arrangements, the recess in the engaging device provides an engaging device having material that forms an integral filler for a weld process used in connecting the end regions of the centralizer end collar. Furthermore, the arrangement of the end collars and the staple helps to reduce the transfer of heat to the centraliser sub body when welding the centraliser around the centraliser sub body.

The first end collar 52 has a second set of holes, and a second staple 70 is inserted into the holes and welded securely welded into position. The second end collar 54 is similarly positioned around the second end region, and another two staples 70 are inserted into holes in the ends regions of the collar 54 and welded into position.

The welded connection formed through use of the staple, with a neck, and expanded out regions housed within the first and second end regions of the end collars is then very strong. Circumferential loads are primarily taken through the necks of the staples.

Two specific example arrangements for nominally sized 11⅞" (30.163 cm) and 11¾" (29.845 cm) casings are:
Machined Max/Min OD for OD 26 and OD 32—Imperial and (Metric)

OD 16: 11⅞" OD 26: 12.210"/12.200" and OD 32 11.826"/11.816"

OD 16: 11¾" OD 26: 12.090"/12.080" and OD 32 11.702"/11.692"

(OD 16: 30.163 cm OD 26: 31.013 cm/30.988 cm and OD 32 30.038 cm/30.013 cm)

(OD 16: 29.845 cm OD 26: 30.709 cm/30.683 cm and OD 29.723 cm/29.698 cm)

End collars 52 and 54 and spring bows 56 of the centralizer 50 having a thickness of 4 mm+/−0.2 mm.

Alternative arrangements to those described with reference to the figures are now briefly discussed.

In some arrangements, the end collars 52, 54 are split at more than one circumferential position, such that the centralizer is formed from more than one piece. In some arrangements, the centralizer end collars are split at different circumferential positions to each other.

In other arrangements, only the first end collar 52 of the centralizer 50 is mounted around the second portion 30 of the centralizer sub body 10. In some arrangements, there is a further portion similar to the second portion as shown in the figures, where this further portion is not shown in the figures. In these arrangements, the second end collar 54 is mounted around the further portion.

In other arrangements, the centralizer sub body is not made from a piece of coupling stock, being made from another appropriate grade base material which conforms to regulatory requirements.

In other arrangements cylindrical portions 14 and 15 have been machined. In other arrangements, the cylindrical portions 14 and 15 are moulded or cast.

In some arrangements, second section 30 has been machined. In other arrangements, second portion 30 is moulded or cast.

In some arrangements, the first portion of the tubular body does not have a protrusion 20. In some arrangements, the third portion of the tubular body does not have a protrusion 40.

In some arrangements chamfered collars (protrusions) 20, 40 are securely attached to the generally tubular body of the centralizer sub body rather than being welded in place. In some arrangements, the tubular body of the centralizer sub body 10 is machined to form the chamfered collars 20, 40. In other arrangements, the tubular body of the centralizer sub body 10 is moulded or cast to form the chamfered collars 20, 40. In some arrangements, collars 20, 40 are stopping collars or stopping devices.

In other arrangements, collar 20 is not chamfered. In some arrangements, ring section 22 is not flat topped, having a curved top surface. In some arrangements collar 20 has a length greater than 1" (2.54 cm) and in other arrangements the length is less than 1" (2.54 cm). In some arrangements ring section 22 has a length greater than 0.4" (1 cm) and in other arrangements the length is less than 0.4" (1 cm). In some arrangements, chamfered collars 20, 40 have two chamfered surfaces on either side of ring portions 22, 42. In other arrangements, chamfered collars 20, 40 do not have ring sections 22, 42 and in cross section would be triangular rather than a flat topped triangle. In some arrangements, the angle of the chamfer is approximately 24 degrees. In other arrangements the angle of the chamfer is greater than 24 degrees. In other arrangements, the angle of the chamfer is less than 24 degrees.

In other arrangements the centralizer has more than or less than six spring bows. In some arrangements the curvature of one or more of the spring bows may not be offset from one or more of the other spring bows, as shown in the figures. Instead, the curvature of the spring bows may be the same.

In some arrangements, the coupling stock is not machined to form the second portion 30. This can be the case where the OD of the coupling stock used to make the centralizer sub body 10 already has the required OD 32. In other arrangements, OD 32 is not chosen as the minimum OD for a standard coupling stock that meets regulatory requirements. In some arrangements, OD 32 of the second portion is chosen as the tightly tolerance OD that is greater than the minimum OD for a standard coupling stock. In such a situation, there will be a fraction of available coupling stock that have a starting OD that is below this OD and which are not then useable to make a centralizer sub. As OD 32 is increased above the minimum OD that conforms to regulatory requirements, the fraction of coupling stock that can be used to make the centralizer sub body decreases. This may however be acceptable in some situations. Additionally, the overall OD of the centralizer sub, including the centralizer mounted on the centralizer sub body, will tend to increase. Again, this may be acceptable in some situations.

In some arrangements, where the second portion 30 has OD 32 greater than the minimum OD that complies with regulatory requirements, other parts of the centralizer sub body 10 may have an OD that is less than OD 32, but where that smaller OD still complies with regulatory requirements.

In some arrangements, where there are no protrusions 20, 40, cylindrical sections 14 and 15 maintain the centralizer 30 around the second section 30. In some arrangements, the coupling stock has a large OD within allowable ODs and the difference between OD 16 and OD 32 is sufficient for centralizer 50 mounted on the second section 30 to be maintained in position.

In some arrangements, ring sections 22 and 42 have different ODs.

In some arrangements, the centraliser sub body 10 does not have a third portion 17, where the second tubular section 30 extends to the end of the centraliser sub body 10. In such an arrangement an assembled centraliser 50 can be slid over the end of the centraliser sub body 10 at the other end to the first portion 13. An appropriate coupler or collar, or casing joint, coupling to the centraliser sub body 10 at the end away from the first portion is then configured to maintain the centraliser 50 at the position of the second portion 30. In other words, the centralizer 50 cannot slide past the ring section 20 of the first portion 17 in one axial direction and cannot slide past the appropriate coupler in the other axial direction.

Therefore, collars 20 and 40, ensure that the centralizer spring bows 56 do not suffer permanent deformation. They also ensure that the end collars 52, 54 of the centralizer 50 do not becoming snagged or fouled on the inner surface of the existing tubular or borehole.

In some arrangements, holes 62, 64 do not extend all the way through the end regions 53, 55 of the end collars of the centralizer 50, forming a recess. In some arrangements, the recess or hole has a stepped or ledged interior. In fact, it will be appreciated that any reference to a recess or a hole in this document allows for the term recess to be replaced with the term hole because the functionality provided by both a recess and a hole in the context of this document is interchangeable.

In some arrangements, there is no need for a separate staple as an engaging device. In these arrangements, the engaging element on the first end region of an end collar is configured to connect with the engaging element of the second end region of the first end collar. For example, in some arrangements the first end region has a plug like engaging element, and the second end region has a socket like engaging element that is configured to connect with the plug. In some arrangements, the first end region has an end with a protruding end and the second end region has a hole or recess configured to receive the protruding end. Therefore, in some arrangements at least one end region need not have a hole or recess. In some arrangements the engaging element on the first end region has a hole in the shape of half of a figure of eight, and the engaging element on the second end region has a protrusion in the shape of half of a figure of eight. The protrusion of the second end region being configured to fit into the hole in the first end region. In some arrangements, the hole has a recess formed adjacent to it in the first end region. In other arrangements, the protrusion has a recess formed adjacent to it in the second end region In some arrangements, the staple has a thickness 72 that matches the recess thickness in the end regions. In some arrangements, holes 62, 64 have stepped inside regions.

In some arrangements, the holes 62, 64 in the end regions are not circular, but are polygonal in cross section. In some arrangements, portions 76, 78 of the staple 70 are not circular, but are polygonal in cross section. In some arrangements, the lateral inner surface of the hole 66 matches the lateral outer surface of the staple 76a over only a portion of the lateral inner surface of the hole 66. In some arrangements, the lateral inner surface of the hole 66 matches the lateral outer surface of the staple 76a over only the perimeter that is welded. In some arrangements, holes 62, 64 are formed with an adjacent recess in the end regions 53, 55 thereby forming a wall that acts as a filler material when welding the staples into place. In these arrangements, the staples 70 need not then have a recess or sacrificial wall.

In some arrangements, recesses 80, 90 are not semi-circular shaped. In order to provide the required functionality the recesses, or welding material receiving portions are arranged proximate to the join that is being welded such that they can receive welding material and more specifically so that they can receive excess welding material. Excess welding material is considered any material that is not positioned between the surfaces being welded. It will be appreciated that in some arrangements the "excess" welding material received by the welding material receiving portions has a positive effect on the bond or at least in the process of forming the bond. As such, the excess welding material may be considered essential to the bonding process.

In some arrangements, staple 70 is made from a different material to the end collars 52, 54. In some arrangements, welding involves use of a consumable electrode. However, the recesses 80, 90 in the staple still serve to allow for the pooling of molten metal within the recess that then does not sit proud of the thickness of the end collars.

In some arrangements, one staple 70 is used to connect the end regions 53, 55 together. In other arrangements more than two staples are used to connect the end regions 53, 55 together. In some arrangements, staple 70 has a thickness greater than the thickness of the end collars of the centralizer. In other arrangements, staple has a thickness less than the thickness of the end collars of the centralizer.

In some arrangements, machining involves use of a lathe, or milling machine or other appropriate machine or technique useable to manufacture the disclosed systems.

In some arrangements, regulatory standards other than API 5CT apply.

Features of the arrangements described and shown in the figures can be combined in any combination, as would be understood by the skilled reader as being practicable. The scope of the present disclosure is not intended to be limited to any particular described arrangement but instead is defined by the attached claims.

The invention claimed is:

1. A centralizer for being mounted around a centralizer sub body to form a centralizer sub, the centralizer comprising:
   first and second opposing end collars arranged, in use, to be positioned around a longitudinal axis of the centralizer;
   a plurality of spring bows extending from the first end collar to the second end collar, wherein
   the first end collar comprises first and second end regions arranged, in use, to face one another;
   the first and second opposing end regions comprise first and second engaging elements respectively; and the first end region is configured to be connected, in use, to the second end region via the first and second engaging elements;
one or more excess welding material receiving elements arranged, in use, to receive any excess welding material when the first and second end regions are connected by a welding process.

2. A centralizer according to claim 1, wherein the one or more excess welding material receiving elements each define a recess or hole.

3. A centralizer according to claim 1, wherein the excess welding material receiving elements are arranged proximate to where the first and second end regions are arranged to be connected.

4. A centralizer according to claim 1, wherein the first end region is configured to be connected to the second end region via an engaging device arranged, in use, to be connected to the first and second engaging elements.

5. A centralizer according to claim 4, further comprising the engaging device, in use.

6. A centralizer according to claim 4, wherein the engaging device comprises:
a first portion configured to engage with the first engaging element; and
a second portion configured to engage with the second engaging element.

7. A centralizer according to claim 6, wherein the first and second engaging elements have profiles arranged to match profiles defined by the first and second portions of the engaging device respectively.

8. A centralizer according to claim 6, wherein the first and second engaging elements define recesses within the first and second end regions respectively, and the first and second portions of the engaging device are protrusions.

9. A centralizer according to claim 8, wherein the profiles of the first and second engaging elements each comprise a neck extending from an edge of the first and second end regions into a head within the first end collar, respectively.

10. A centralizer according to claim 1, wherein the first and second engaging elements are arranged to connect to one another.

11. A centralizer according to claim 1, wherein the second end collar has the same configuration as the first end collar.

12. A centralizer according to claim 11, wherein first and second end regions of the second end collar are arranged at the same position as the first and the second end regions of the first end collar with respect to the spring bows.

13. A centralizer according to claim 1, wherein the centralizer is a single piece centralizer formed from a blank.

14. A centralizer according to claim 1, wherein when the first and second end regions of the first end collar are connected, the first end collar forms a continuous ring.

15. A centralizer sub comprising:
a centralizer sub body which is a generally tubular structure having a longitudinal axis; and
a centralizer comprising:
first and second opposing end collars arranged, in use, to be positioned around a longitudinal axis of the centralizer;
a plurality of spring bows extending from the first end collar to the second end collar, wherein
the first end collar comprises first and second end regions arranged, in use, to face one another;
the first and second opposing end regions comprise first and second engaging elements respectively; and
the first end region is configured to be connected, in use, to the second end region via the first and second engaging elements;
one or more excess welding material receiving elements arranged, in use, to receive any excess welding material when the first and second end regions are connected by a welding process.

16. A method of manufacturing a centralizer sub, comprising:
providing a centralizer sub body;
providing a centralizer, wherein the centralizer comprises:
first and second opposing end collars arranged, in use, to be positioned around a longitudinal axis of the centralizer;
a plurality of spring bows extending from the first end collar to the second end collar;
wherein the first end collar comprises first and second end regions arranged, in use, to face one another;
wherein the first and second opposing end regions comprise first and second engaging elements respectively; and
wherein the first end region is configured to be connected, in use, to the second end region via the first and second engaging elements;
one or more excess welding material receiving elements arranged, in use, to receive any excess welding material when the first and second end regions are connected by a welding process; and
mounting the centralizer on the centralizer sub body.

17. The method according to claim 16, wherein the mounting the centralizer on the centralizer sub body comprises:
wrapping the centralizer around the centralizer sub body so that the first and second end regions of the first end collar face one another; and
connecting the first and second regions of the first end collar by a welding process.

18. An engaging device for use in forming a centralizer, the centralizer comprising first and second opposing end collars arranged, in use, to be positioned around a longitudinal axis of the centralizer, and a plurality of spring bows extending from the first end collar to the second end collar, the engaging device comprising:
a first portion configured to connect to a first engaging element of a first portion of the first end collar;
a second portion configured to connect to a second engaging element of a second portion of the first end collar; and
one or more excess welding material receiving elements arranged, in use, to receive any excess welding material when the first and second portions of the engaging device are respectively connected to the first and second engaging elements of the first end collar by a welding process;
wherein, in use, the engaging device forms part of the centralizer and connects the first and second portions of the end collar to one another to form the end collar.

19. An engaging device according to claim 18, wherein the one or more excess welding material receiving elements each define a recess or hole.

20. An engaging device according to claim 18, wherein the excess welding material receiving elements are arranged in portions of the engaging device proximate to where the first and second portions of the engaging device are arranged to be connected to the first and second engaging elements of the first end collar.

21. An engaging device according to claim 18, wherein the first and second portions of the engaging device each have a profile arranged to match a profile respectively defined by the first and second engaging elements of the first end collar.

22. An engaging device according to claim 18, wherein the first and second portions of the engaging device are protrusions and the first and second engaging elements define recesses.

23. An engaging device according to claim 18, wherein the engaging device is a figure-of-eight shape comprising two heads and a neck connecting the two heads, wherein the first and second portions are the two heads.

24. A centralizer for being mounted around a centralizer sub body to form a centralizer sub, the centralizer comprising:
- first and second opposing end collars arranged, in use, to be positioned around a longitudinal axis of the centralizer, the first and second end collars comprising first and second end regions arranged, in use, to face one another;
- a plurality of spring bows extending from the first end collar to the second end collar; and
- a plurality of the engaging devices according to claim 18, a first of a plurality of engaging elements arranged to connect the first end region of the first end collar to the second end region of the first end collar, and a second of the plurality of engaging elements arranged to connect the first end region of the second end collar to the second end region of the second end collar.

* * * * *